(12) United States Patent
Staiger

(10) Patent No.: US 8,664,346 B2
(45) Date of Patent: *Mar. 4, 2014

(54) PROCESS FOR PREPARING ORGANOPOLYSILOXANES

(75) Inventor: Gerhard Staiger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 383 days.

This patent is subject to a terminal disclaimer.

(21) Appl. No.: 12/521,923

(22) PCT Filed: Jan. 22, 2008

(86) PCT No.: PCT/EP2008/050718
§ 371 (c)(1),
(2), (4) Date: Jul. 1, 2009

(87) PCT Pub. No.: WO2008/092775
PCT Pub. Date: Aug. 7, 2008

(65) Prior Publication Data
US 2010/0076170 A1 Mar. 25, 2010

(30) Foreign Application Priority Data
Jan. 31, 2007 (DE) .......................... 10 2007 004 838

(51) Int. Cl.
*C08G 77/04* (2006.01)
(52) U.S. Cl.
USPC .............................................. 528/10; 528/12
(58) Field of Classification Search
USPC ......................................................... 528/10
See application file for complete search history.

(56) References Cited

U.S. PATENT DOCUMENTS

| 3,450,672 | A | | 6/1969 | Merrill |
| 3,978,025 | A | * | 8/1976 | Magne ............................. 528/32 |
| 4,618,665 | A | * | 10/1986 | Braun et al. ..................... 528/25 |
| 4,670,299 | A | * | 6/1987 | Fukuyama et al. .......... 427/99.3 |
| 4,855,472 | A | | 8/1989 | Burkhardt |
| 5,476,916 | A | | 12/1995 | Pachaly et al. |
| 6,232,423 | B1 | | 5/2001 | Kohler et al. |
| 7,737,292 | B2 | * | 6/2010 | Ackermann ................... 556/450 |
| 8,076,438 | B2 | * | 12/2011 | Ackermann ..................... 528/12 |
| 2001/0044495 | A1 | * | 11/2001 | Koike et al. ..................... 525/100 |
| 2005/0038149 | A1 | * | 2/2005 | Hashimoto et al. ............ 524/261 |
| 2007/0078277 | A1 | * | 4/2007 | Ackermann ................... 556/470 |
| 2011/0065881 | A1 | * | 3/2011 | Iji et al. .......................... 528/10 |

FOREIGN PATENT DOCUMENTS

| DE | 854708 | 11/1952 |
| DE | 1668172 A | 5/1971 |
| DE | 228550 A1 | 10/1985 |
| DE | 3625688 A1 | 2/1988 |
| EP | 0658588 A1 | 6/1995 |
| EP | 0992526 A1 | 4/2000 |
| KR | 10-0795944 | 1/2008 |

OTHER PUBLICATIONS

Kopylov V M et al., Features of Influence of HCl on Hydrolytic Copolycondensation of Bifunctional Organochlorosilanes with Trimethylchlorosilane, Journal of General Chemistry USSR, Consultants Bureau, New York, NY, US, vol. 61, No. 6, Jun. 1, 1991, pp. 1257-1261, XP000274401, ISSN: 0022-1279.

* cited by examiner

*Primary Examiner* — Marc Zimmer
(74) *Attorney, Agent, or Firm* — Brooks Kushman P.C.

(57) ABSTRACT

A targeted molecular weight of an organopolysiloxane is obtained in a two stage hydrolysis by hydrolyzing a chlorosilane with from 0.002 to 0.6 mol of water in a first step in the presence of alcohol, in which the pressure and/or temperature are adjusted such that following further hydrolysis in a second step, the targeted molecular weight is obtained.

20 Claims, No Drawings

PROCESS FOR PREPARING ORGANOPOLYSILOXANES

CROSS-REFERENCE TO RELATED APPLICATION

This application is the U.S. national phase of PCT Appln. No. PCT/EP2008/050718 filed Jan. 22, 2008 which claims priority to German application DE 10 2007 004 838.8 filed Jan. 31, 2007.

BACKGROUND OF THE INVENTION

1. Field of the Invention

The invention relates to a multistage process for the preparation of organopolysiloxanes by hydrolysis and condensation of chlorosilanes.

2. Description of the Related Art

Processes for the preparation of organopolysiloxanes are already known. In this context, reference may be made, for example, to DE 16 68 172 A, in which a water-soluble inert solvent is used. Furthermore, DE 854 708 B describes a process for the preparation of siloxanes resins, in which alkoxylation, hydrolysis and condensation are carried out in one step, the reactions taking place in an uncontrolled manner.

SUMMARY OF THE INVENTION

The present invention relates to a process for the preparation of organopolysiloxanes, in which
in a first step, chlorosilanes are reacted with from 0.002 to 0.6 mol of water per mole of hydrolyzable chlorine and with from 0.3 to 1.6 mol of alcohol per mole of hydrolyzable chlorine, the molar ratio of water to alcohol being from 0.001 to 1.5,
in a second step, the reaction mixture obtained in the first step is optionally mixed with a water-insoluble organic solvent having a density of less than 0.9 kg/l, and water is metered in in amounts of from 0.2 to 100 mol of water per mole of Si component, and
in a third step, after the end of the reactions of the second step, the aqueous alcoholic phase is separated off, the molecular weight of the organopolysiloxane being adjusted to the respective desired level by the conditions of pressure and temperature chosen in the first process step, and, while maintaining the other reaction parameters, the molecular weight being increased by a pressure increase and the molecular weight being reduced with a pressure reduction and, while maintaining the other reaction parameters, the molecular weight of the organopolysiloxane being reduced by an increase in temperature and the molecular weight being increased with a reduction of the temperature.

DETAILED DESCRIPTION OF THE PREFERRED EMBODIMENTS

The chlorosilanes used in the first step of the process according to the invention are preferably those of the formula

$$R_a SiCl_{4-a} \quad (I),$$

in which R may be identical or different and is a monovalent, SiC-bonded, optionally substituted hydrocarbon radical and a is 0, 1, 2, or 3.

Examples of radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as cyclopentyl, cyclohexyl, cycloheptyl, and methylcyclohexyl radicals; aryl radicals such as the phenyl and the naphthyl radicals; alkaryl radicals such as o-, m-, and p-tolyl radicals, xylyl radicals and ethylphenyl radicals; and aralkyl radicals such as the benzyl radical and the α- and the β-phenylethyl radicals.

Examples of substituted radicals R are all radicals which are mentioned above for R and can preferably be substituted by mercapto groups, epoxy-functional groups, carboxyl groups, keto groups, enamine groups, amino groups, aminoethylamino groups, isocyanato groups, aryloxy groups, acryloyloxy groups, methacryloyloxy groups, hydroxyl groups and halogen groups.

Radical R preferably includes hydrocarbon radicals having 1 to 8 carbon atoms, most preferably the methyl radical.

Examples of silanes of the formula (I) are tetrachlorosilane, methyltrichlorosilane, dimethyldichlorosilane, trimethylchloro-silane, isooctyltrichlorosilane, phenyltrichlorosilane, diphenyldichlorosilane and methylphenyldichlorosilane.

The silanes used in the process according to the invention are preferably liquid at 20° C. under pressure from 900 to 1100 hPa. Mixtures of silanes of the formula (I) with at least one trichlorosilane are preferably used.

In the context of the present invention hydrolyzable chlorine is to be understood as chlorine which is present in the form of SiC1 groups.

In the first step of the process according to the invention, chlorosilanes are preferably reacted with from 0.0021 to 0.75 mol, more preferably from 0.0022 to 0.55 mol, of water per mole of hydrolyzable chlorine, and with from 0.35 to 1.5 mol, more preferably from 0.4 to 1.4 mol, of alcohol per mole of hydrolyzable chlorine. The molar water-to-alcohol ratio is preferably from 0.0015 to 1.45.

Examples of alcohols which can be used in the first step of the process according to the invention are all alcohols which are liquid at a temperature of 20° C. and a pressure of from 900 to 1100 hPa, such as methanol, ethanol, n-propanol, isopropanol butanol, pentanol, hexanol or heptanol, methanol, ethanol and butanol being preferred and ethanol being particularly preferred.

If desired, further substances can also be used in addition to chlorosilanes, water and alcohol in the first step of the process according to the invention. Examples of optionally used further substances are water-insoluble organic solvents, such as toluene, or alkoxysilanes, such as tetraethoxysilane.

In the process according to the invention, the molecular weight of the end product (organopolysiloxane) can be determined in an unambiguous manner by the combination of the reaction parameters exit gas pressure and reaction temperature in the first step of the preparation process (alkoxylation step). It was found that, at a certain, freely selectable temperature, which is preferably in the range from 10 to 70° C., most preferably in the range of 30-40° C., a desired molecular weight and properties associated therewith, such as viscosity, can be obtained by the choice of the pressure. The choice of the pressure is made in the context that, in comparison with a resin which is prepared under standard conditions, a resin having a higher molecular weight is obtained by increasing the pressure pressure, at a constant reaction temperature. In a corresponding manner, it was found that, at a certain, freely selectable pressure, which is preferably in the range from 500-2000 mbar, most preferably in the range from 950 to 1500 mbar, a desired molecular weight and properties associated therewith, such as viscosity, can be obtained by the choice of the temperature in the first step of the preparation process. The choice of the temperature is made in the context that, in comparison with a resin which was prepared under standard conditions, a resin having a higher molecular weight is obtained by reducing the temperature with constant exit gas pressure. Accordingly, a reduction of the molecular weight of the end product is obtained on increasing the temperature.

For example, the molecular weight of the organopolysiloxane is preferably increased in the process according to the invention by increasing the pressure in the first step above 900 mbar or the molecular weight is reduced by increasing the temperature in the first step above 30° C. at atmospheric pressure and the molecular weight of the organopolysiloxane is increased on reduction of the temperature in the first step below 30° C. at atmospheric pressure.

In the first step of the process according to the invention, silane, water, alcohol and optionally further substances are mixed together in any desired manner and allowed to react, alkoxysilanes, alkoxychlorosilanes and their hydrolysates and condensates and, in gaseous form, hydrogen chloride, alkyl chloride and dialkyl ether forming. The hydrogen chloride gas obtained in the first step can be used directly in other processes, for example with methanol for the preparation of chloromethane, which in turn is used in the methylchlorosilane synthesis. Thus, the chlorine can be circulated without being released to the environment.

The first step may be carried out batchwise or continuously, the batchwise process preferably being carried out with stirring. The first step of the process is preferably carried out in a loop reactor, more preferably without introduction of mechanical energy, i.e. only with natural circulation.

In the reaction mixture obtained in the first step, the silicon component substantially comprises chloro-, hydroxy-, and alkoxy-functional silanes and siloxanes and optionally cyclosiloxanes. Furthermore, the reaction mixture contains water, alcohol, hydrogen chloride and small amounts of alkyl chloride, dialkyl ether and optionally further substances.

In the context of the present invention, data relating to the density are intended to be based on a temperature of 20° C. and ambient pressure, i.e. from 900 to 1100 hPa.

In the context of the present invention water-insoluble organic solvents are to be understood as meaning those solvents which have a solubility at 25° C. and ambient pressure, i.e. from 900 to 1100 hPa, of less than 1 g of solvent/100 g of water.

Examples of optional water-insoluble organic solvents are saturated hydrocarbons such as pentane, hexane, heptane or octane and branched isomers thereof and mixtures of the saturated hydrocarbons; unsaturated hydrocarbons such as hexene, heptene, octene and 1-decene; ketones such as acetone, methyl ethyl ketone and methyl isobutyl ketone; and aromatic hydrocarbons such as benzene, toluene and xylenes, preferably toluene.

If water-insoluble organic solvent is used in the second step of the process according to the invention, the relevant amounts are preferably from 1 to 100 mol, particularly preferably from 2 to 90 mol, based in each case on one mole of silicon component. Water-insoluble organic solvent is preferably used in the second step.

If desired, further substances may also be used in the second step of the process according to the invention. Examples of optionally used further substances are chlorosilanes, such as those of the formula (I), or alkoxysilanes, such as tetraethoxysilane, or alcohols, for example, ethanol. If further substances are used in the second stage, the relevant amounts are preferably from 0.01 to 40 parts by weight, based on 100 parts by weight of the silicon component used in the first step.

In the second step of the process according to the invention, the silicon component of the reaction mixture obtained in the first step and optionally used further silanes are hydrolyzed and condensed to the desired degree of polymerization by controlled addition of water.

In a preferred embodiment of the process according to the invention, the reaction mixture obtained in the first step is optionally mixed with toluene and optionally with other substances in the second step and water is metered in over a defined period, the mixing process being carried out by means of introduction of mechanical energy, for example, a stirrer.

In a particularly preferred embodiment of the process according to the invention, the second step is carried out in a batch reactor, for example those having an internal volume of 12 m$^3$, by conveying the reaction mixture obtained in the first step from the bottom of the reactor via a pump circulation line (for example at a circulation rate in the reactor of 80 m$^3$/h) into the lower third of the reactor and metering water, preferably over the course of from 5 to 100 minutes into the pump circulation line, it being possible to effect stirring simultaneously. In a further particularly preferred embodiment, the water used in the second stage is metered from above into the reactor, stirring being effected simultaneously. The second step is preferably carried out at a temperature of from 0 to 100° C., in particular from 20 to 80° C., and preferably at a pressure of from 500 to 2000 hPa, more preferably from 600 to 1500 hPa.

The hydrolysis or condensation reaction taking place in the second step can be stopped by any desired method, for example, dilution with water or neutralization with base such as, sodium hydroxide solution.

In the third step of the process, the siloxane phase, optionally containing solvent, is separated from the aqueous alcoholic hydrogen chloride phase. This can be effected by methods known to the person skilled in the art. For example the reaction mixture may stand for 5 to 60 minutes until the phases have separated, followed by discharging and working up the HCl, alcohol and water-containing phase, and pumping off and working up the siloxane-containing phase.

The siloxane phase thus obtained can then be worked up by any desired method known per se, such as, neutralization, filtration or separation of all readily volatile constituents, preferably by distillation. The readily volatile constituents are preferably cyclic siloxanes and the water-insoluble organic solvent having a density of less than 0.9kg/l. Furthermore, the concentration can be increased, for example in the siloxane phase by removing the solvent, by distillation in a thin-film evaporator, and organopolysiloxane solutions can thus be prepared or the solvent can be completely removed and solvent-free siloxanes thus obtained.

A multiplicity of organopolysiloxanes having defined properties can be reproducibly prepared by the process according to the invention, for example those which contain SiC-bonded radicals, hydroxyl radicals and/or alkoxy radicals. In particular, the process is outstandingly suitable for the preparation of organopolysiloxane resins.

The organopolysiloxanes prepared according to the invention may be solid or liquid at 20° C. and at a pressure of from 900 to 1100 hPa and preferably have an average molecular weight, measured against a polystyrene standard, of from 162 to 100,000 g/mol, more preferably from 200 to 20,000 g/mol.

The organopolysiloxanes prepared according to the invention are at least partially, but preferably, completely soluble in alkoxy- and/or hydroxysilanes and condensates thereof.

The organopolysiloxanes prepared according to the invention are preferably those of the formula

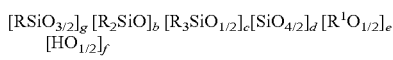

$[RSiO_{3/2}]_g [R_2SiO]_b [R_3SiO_{1/2}]_c [SiO_{4/2}]_d [R^1O_{1/2}]_e [HO_{1/2}]_f$ where R is a methyl, isooctyl or phenyl radical, $R^1$ is a methyl, ethyl or butyl radical, g=2-200, b=0-100, c=0-50, d=0-100, e=0-20 and f=0-10.

Examples of organopolysiloxanes prepared according to the invention are $[MeSiO_{3/2}]_{72} [Me_2SiO]_{24} [EtO^{1/2}]_{2.8} [HO^{1/2}]_{0.4}$, $[MeSiO_{3/2}]_{12.2} [Me_2SiO]_{3.3} [Me\,SiO_{1/2}]_{1.4} [EtO_{1/2}]_{0.6} [HO_{1/2}]_{0.18}$, $[MeSiO_{3/2}]_{15.3}[Me_2SiO]_{2.6}[Me\,SiO_{1/2}][IOSiO_{3/2}]_{0.8}[MeO_{1/2}]_2[HO_{1/2}]_{0.3}$ and $[PhSiO_{3/2}]_{9.8} [Me_2SiO]_2[MeO_{1/2}]_{1.8}[BuO_{1/2}]_{0.04}[HO_{1/2}]_{0.18}$. Me being a methyl radical, Et being an ethyl radical, IO being an isooctyl radical, Ph being a phenyl radical and Bu being a butyl radical.

The organopolysiloxanes prepared according to the invention can be used for all purposes for which organopolysiloxanes are useful, for example in building protection, in the coating sector, in cosmetic products and in the textile and paper sectors. They are particularly suitable for the preparation of emulsions and as binders for the preparation of paints and finishes.

The process according to the invention has the advantage that it is simple to carry out and organopolysiloxanes having a high yield can be prepared. The process according to the invention has the further advantage that the optionally used water-insoluble organic solvent, the hydrogen chloride and the alcohol can be recovered in a simple manner.

With the aid of the process according to the invention, organopolysiloxanes are obtained which have a high storage stability, a very low chloride content and a low VOC content, and which can be prepared very economically. The process also has the advantage of being able to prepare organopolysiloxanes which are solid at ambient temperature and which have a glass transition temperature (Tg) of up to 50° C. (heating rate 6° C. per minute).

The process also has the advantage of being able to prepare organopolysiloxanes which are solid at ambient temperature and which have a glass transition temperature (Tg) of up to 50° C. (heating rate 6° C. per minute.

In the following examples, all data on parts and percentages are based on weight, unless stated otherwise. Unless stated otherwise, the examples are carried out at ambient pressure, i.e. at about 1000 hPa, and at room temperature i.e. about 20° C. or a temperature which is established on combining the reactants at room temperature without additional heating or cooling. All viscosity data in the examples are based on a temperature of 25° C.

EXAMPLE 1

1000 kg/h of a chlorosilane mixture comprising 800 kg/h of methyltrichlorosilane and 200 kg/h of dimethyldichlorosilane and 700 kg/h of a mixture of 638 kg/h of ethanol and 62 kg/h of water are metered continuously into a continuously operated reaction loop having an internal volume of 1.35 $m^3$, of which 0.85 $m^3$ represents devolatilization volume, with a natural circulation. The reaction temperature is 30° C., the gauge pressure is, as represented in Table 1, 0 to 400 mbar and the average residence time is 20-24 minutes. During the reaction, 350-400 kg/h of hydrogen chloride are liberated, which is fed to the hydrogen chloride recovery plant.

For the hydrolysis/condensation, 2500 kg of the HCl-concentrated partial alkoxylate thus obtained is initially introduced with 3000 kg of toluene in a batch reactor having an internal volume of 12 m3 and 510 kg of water are metered in over the course of 75 minutes with thorough mixing (80 $m^3/h$). The reaction temperature is up to 70° C., the gauge pressure does not exceed the gauge pressure obtained in the first step of the reaction (see Table 1).

The acid concentration is then reduced by adding 3050 kg of water to an unreactive degree (HCl content in the acid phase, ethanol phase, water phase <14% by weight). After careful thorough mixing for from 5 to 15 minutes, the mixture is discharged into a 12 $m^3$ container and left to stand for 60 minutes. Thereafter, the ethanol/hydrogen chloride/water-containing phase is separated from the siloxane-containing toluene phase. In further working-up steps, the resin-containing toluene phase is concentrated to a higher solids content in distillation column operated with random packings (bottom temperature 114° C., bottom gauge pressure 100 mbar, residence time 60 minutes), neutralized with sodium bicarbonate, freed from catalytically active metal traces with active carbon, and then filtered over a filter aid and freed from volatile constituents in a thin-film evaporator (120-200° C.) and with a vacuum of from 50 to 100 mbar. The toluene obtained in the reaction step comprising concentration and thin-film evaporation is used again in the second reaction step. The acidic ethanolic/aqueous phase from the third step (phase separation) is redistilled after being rendered alkaline and is used again in the first reaction step.

An organopolysiloxane having an average empirical formula $[MeSiO_{3/2}]_{72} [Me_2SiO_{2/2}]_{23.9}[HO_{1/2}]_{0.4}$ according to $^1$H-NMR, $^{29}$Si-NMR and GPC spectroscopy (measured against polystyrene standard, taking into account the weight average Mw) is obtained.

TABLE 1

Viscosity of the methylsilicone resin according to Example 1 as a function of the HCl exit gas pressure

| Batch | Exit gas pressure [hPa] ([mbar gauge pressure]) | Viscosity (100% at 80° C.) [mPa · s] | OH content [% by weight] | OEt content [% by weight] |
| --- | --- | --- | --- | --- |
| AH384 | 970 (0) | 5630 | 0.39 | 3.43 |
| AH388 | 1066 (100) | 15,600 | 0.51 | 3.09 |
| AH386 | 1173 (200) | 25,900 | 0.50 | 2.95 |
| AH385 | 1266 (300) | 60,200 | 0.50 | 2.73 |
| AH387 | 1368 (400) | 291,000 | 0.47 | 2.48 |

EXAMPLE 2

1000 kg/h of a chlorosilane mixture comprising 800 kg/h of methyltrichlorosilane and 200 kg/h of dimethyldichlorosilane and 700 kg/h of a mixture of 638 kg/h of ethanol and 62 kg/h of water are metered continuously into a continuously operated reaction loop having an internal volume of 1.35 $m^3$, of which 0.85 $m^3$ represents devolatalization volume, and a natural circulation. The reaction temperature is adjusted by external temperature regulation according to Table 2, the gauge pressure is 100 mbar and the average residence time is 20-24 minutes. During the reaction, 350-400 kg/h of hydrogen chloride are liberated, which hydrogen chloride is fed to the hydrogen chloride recovery plant.

For the hydrolysis/condensation, 2500 kg of the HCl-concentrated partial alkoxylate thus obtained are initially introduced with 3000 kg of toluene in a batch reactor having an internal volume of 12 m³ and 510 kg of water are metered in in the course of 75 minutes with thorough mixing (80 m³/h). The reaction temperature need no longer be externally regulated in this step and is up to 70° C., and the gauge pressure is 100 mbar.

The acid concentration is then reduced by adding 3050 kg of water, to an unreactive degree (HCl content in the acid phase, ethanol phase, water phase <14% by weight). After careful thorough mixing for from 5 to 15 minutes, the mixture is discharged into a 12 m³ container and left to stand for 60 minutes. Thereafter, the ethanol/hydrogen chloride/water-containing phase is separated from the siloxane-containing toluene phase.

In further working-up steps, the resin-containing toluene phase is concentrated to a higher solids content in a distillation column operated with random packings (bottom temperature 114° C., bottom gauge pressure 100 mbar, residence time 60 minutes), neutralized with sodium bicarbonate, freed from catalytically active metal traces with active carbon and then filtered over a filter aid and freed from volatile constituents in a thin-film evaporator (120-200° C.) and with a vacuum of from 50 to 100 mbar. The toluene obtained in the reaction step comprising concentration and thin-film evaporation is used again in the second reaction step. The acidic ethanolic/aqueous phase from the third step (phase separation) is redistilled after being rendered alkaline and is used again in the first reaction step.

An organopolysiloxane having an average empirical formula $[MeSiO_{3/2}]_{72}$ $[Me_2SiO_{2/3}]_{23.9}$ $[EtO_{1/2}]_{2.8}[HO_{1/2}]_{0.4}$ according to 1H-NMR, 29Si-NMR and GPC spectroscopy (measured against polystyrene standard, taking into account the weight average Mw) is obtained.

TABLE 2

Viscosity of the methylsilicone resin according to Example 2 as a function of the partial alkoxylate temperature

| Batch | Temperature [° C.] | Viscosity (100% at 80° C. [mPa · s] | OH content [% by weight] | OEt content [% by weight] |
|---|---|---|---|---|
| AH403 | 20 | 90,300 | 0.49 | 3.26 |
| AH382 | 30 | 36,910 | 0.47 | 2.92 |
| AH392 | 40 | 28,350 | 0.52 | 3.00 |
| AH393 | 50 | 14,430 | 0.57 | 3.51 |
| AH391 | 60 | 2377 | 0.61 | 4.17 |

The invention claimed is:

1. A process for the production of an organopolysiloxane of a targeted molecular weight, comprising:
   providing a continuous, two-stage reactor for the preparation of the organopolysiloxane, and in the reactor
   a) in a first step, continuously reacting one or more chlorosilanes with from 0.002 to 0.6 mol of water per mole of hydrolyzable chlorine and 0.3 to 1.6 mol alcohol per mole of hydrolyzable chlorine at a temperature and a pressure, such that gaseous hydrogen chloride is evolved, to produce a partial hydrolysate,
   b) in a second step, optionally mixing the partial hydrolysate with a water-insoluble organic solvent having a density of less than 0.9 g/ml, and metering in water in an amount of from 0.2 to 100 mol per mole of hydrolyzable chlorine in the chlorosilane(s); and
   c) in a third step, separating an aqueous alcoholic phase from a phase containing the organopolysiloxane product of said targeted molecular weight;
   the process further comprising first preparing a first organopolysiloxane having a first molecular weight in the reactor by the above steps, and measuring the molecular weight of the first organopolysiloxane; and
   comparing the first molecular weight to the targeted molecular weight and if the first molecular weight is not the targeted molecular weight, regulating the molecular weight of an organopolysiloxane product later isolated to the target molecular weight by adjusting at least one of the temperature and pressure, an increased pressure elevating the molecular weight and an increased temperature lowering the molecular weight.

2. The process of claim 1, wherein, in the first step, chlorosilanes are reacted with from 0.0021 to 0.58 mol of water per mole of hydrolyzable chlorine.

3. The process of claim 1, wherein, in the first step, chlorosilanes are reacted with from 0.35 to 1.5 mol of alcohol per mole of hydrolyzable chlorine.

4. The process of claim 2, wherein, in the first step, chlorosilanes are reacted with from 0.35 to 1.5 mol of alcohol per mole of hydrolyzable chlorine.

5. The process of claim 1, wherein, in the first step, the molar water-to-alcohol ratio used is from 0.0015 to 1.45.

6. The process of claim 2, wherein, in the first step, the molar water-to-alcohol ratio used is from 0.0015 to 1.45.

7. The process of claim 3, wherein, in the first step, the molar water-to-alcohol ratio used is from 0.0015 to 1.45.

8. The process of claim 4, wherein, in the first step, the molar water-to-alcohol ratio used is from 0.0015 to 1.45.

9. The process of claim 1, wherein, in the second step, a water-insoluble solvent is added.

10. The process of claim 2, wherein, in the second step, a water-insoluble organic solvent is added.

11. The process of claim 3, wherein, in the second step, a water-insoluble organic solvent is added.

12. The process of claim 4, wherein, in the second step, a water-insoluble organic solvent is added.

13. The process of claim 5, wherein, in the second step, a water-insoluble organic solvent is added.

14. The process of claim 6, wherein, in the second step, a water-insoluble organic solvent is added.

15. The process of claim 7, wherein, in the second step, a water-insoluble organic solvent is added.

16. The process of claim 8, wherein, in the second step, a water-insoluble organic solvent is added.

17. The process of claim 1 wherein the pressure in the first step is regulated by adjusting the take-off pressure of the hydrogen chloride gas liberated in the first step.

18. The process of claim 1, wherein all the chlorosilanes are methylchlorosilanes and the organosiloxane product is a linear or branched organopolysiloxane.

19. The process of claim 1, wherein the organopolysiloxane product is a solid organopolysiloxane resin.

20. The process of claim 1, wherein no water-insoluble organic solvent is present in the first step.

* * * * *